UNITED STATES PATENT OFFICE.

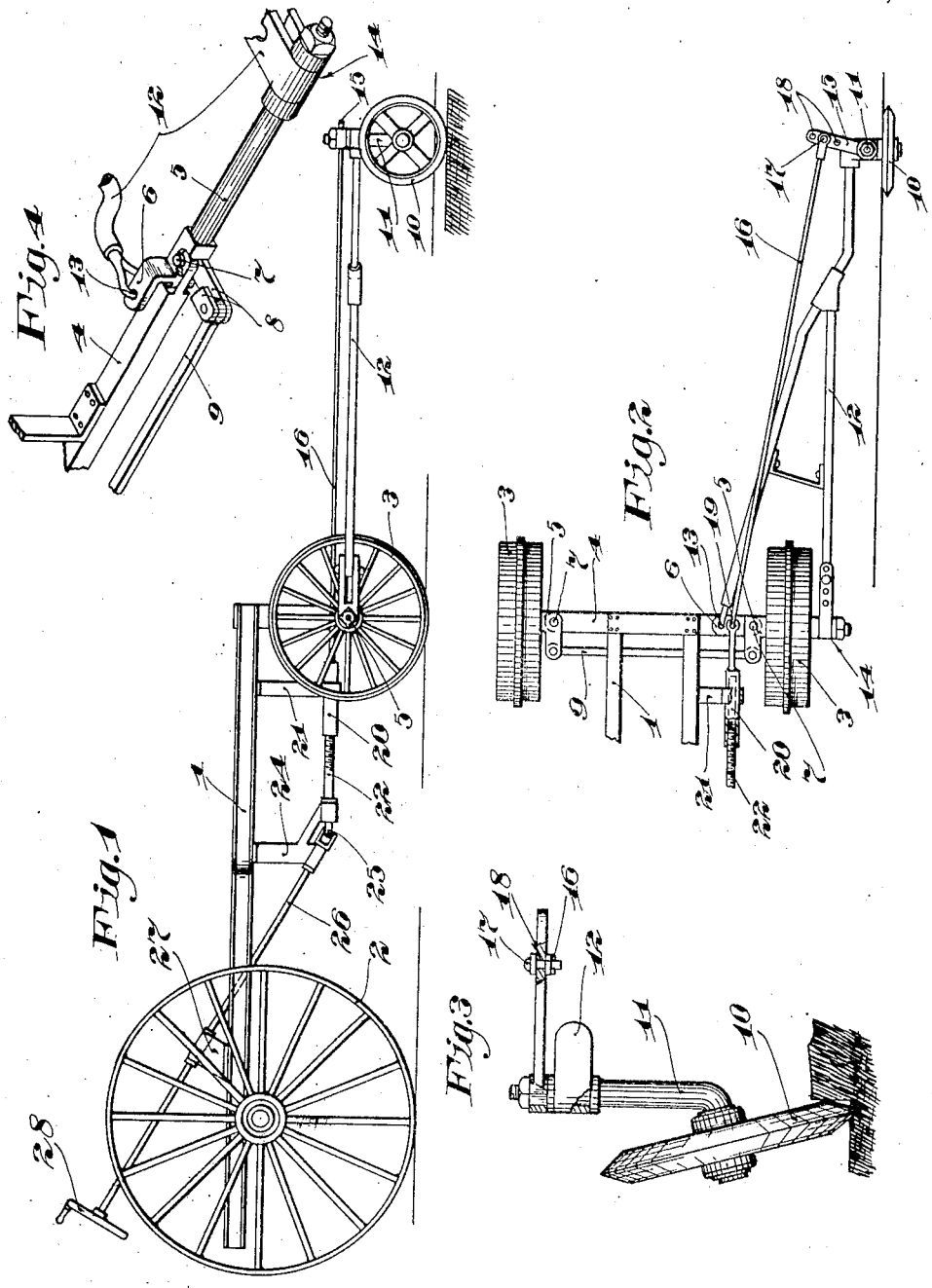
A. STENQUIST.
STEERING DEVICE FOR TRACTORS.
APPLICATION FILED JAN. 27, 1913.
1,083,417.
Patented Jan. 6, 1914.

AUGUST STENQUIST, OF DRAYTON, NORTH DAKOTA.

STEERING DEVICE FOR TRACTORS.

1,083,417.

Specification of Letters Patent.

Patented Jan. 6, 1914.

Application filed January 27, 1913. Serial No. 744,411.

*To all whom it may concern:*

Be it known that I, AUGUST STENQUIST, a citizen of the United States, residing at Drayton, in the county of Pembina and State of North Dakota, have invented certain new and useful Improvements in Steering Devices for Tractors; and I do hereby declare the following to be a full, clear, and exact description of the invention, such as will enable others skilled in the art to which it appertains to make and use the same.

My invention has for its object to provide an extremely simple and highly efficient guide or steering device for tractors or traction engines; and to such ends, the invention consists of the novel devices and combinations of devices hereinafter described and defined in the claims.

Particularly, this improved steering device is applicable to tractors, the front wheels of which are journaled to knuckle-like trunnions pivoted to the front axle and connected for parallel movements. The guide includes a guide wheel journaled to the front end of a long arm-like steering frame, the rear end of which embraces one of the front wheels of the tractor and is pivotally attached on opposite sides thereof, to the opposite end portions of the trunnion on which the said embraced wheel is journaled.

In the accompanying drawings which illustrate the invention, like characters indicate like parts throughout the several views.

Referring to the drawings, Figure 1 is a view in side elevation showing the running gear of the tractor and illustrating my improved guide applied thereto; Fig. 2 is a plan view of the running gear and guide, the rear portions of the former being broken away; Fig. 3 is a front elevation of the guide, some parts being broken away; and Fig. 4 is a perspective view showing a portion of the front axle and the knuckle trunnion to which the guide device is attached.

Of the parts of the running gear of the traction engine, it is only desirable for the purpose of this case to note the framework 1, rear traction wheels 2, front wheels 3, front axle 4 and knuckle trunnions 5. The knuckle trunnion 5 which is at the left hand side of the tractor, is or may be, of the ordinary construction, but the knuckle trunnion 5 which is at the right, is made longer than the other trunnion and is provided at its inner end with an inwardly extended short arm 6. The said knuckle trunnions 5 are pivoted to the front axle 4 at 7 and they are provided with rearwardly extended arms 8 connected by a link 9, which causes the said knuckle trunnions to partake of parallel angular movements.

The furrow engaging guide wheel 10 is journaled on the lower end of a wheel journal bracket 11, the upper end of which is swiveled in the front end of a long trussed arm-like steering frame 12. This steering frame 12 is bifurcated or forked at its rear end so that it embraces the right hand front wheel 3, and the inner prong thereof is pivotally connected to the short arm 6 of the right hand knuckle 5 at 13, while the outer prong thereof is pivotally connected on the outer end of said axle at 14. The said steering frame 12 is thus mounted with freedom for vertical movements, but is caused to partake of the horizontal pivotal or angular movements of the right hand knuckle 5.

Preferably, the guide wheel 10 is set oblique to a perpendicular plane extending longitudinally of the tractor. The swivel journal bracket 11, at its upper end, is provided with a rigidly secured arm 15 to which the front end of a thrust rod 16 is adjustably pivoted, as shown, by means of a bolt 17 and bolt seats 18. At its rear end, the thrust rod 16 is pivotally connected at 19 to the front end of a short plunger 20 that is mounted for endwise movements, but held against rotary movement in a keeper 21 on the traction frame 1. The pivot 19 is located close to the pivot 13 so as not to interfere with vertical movements of the front end of the steering frame 12. The rear end of the plunger 20 is internally screw-threaded and is engaged by the threaded front end of a screw shaft 22 journaled in a bracket 24 on the frame 1. The rear end of the screw shaft 22 is connected by a knuckle joint 25 to the front end of an oblique shaft 26 journaled in the bracket 24 and in a bearing 27 in the frame 1, and provided at its rear end with a hand wheel 28, preferably so located that it may be easily reached by a person standing on the operator's rear platform, not shown.

The guide wheel 10 is adapted to run in a furrow previously formed by one of a set of gang plows drawn by the tractor, but is also adapted to run on smooth or unplowed ground. As the guide wheel is located far ahead of the front wheels of the tractor, and is connected thereto by the long guide frame 12, it has a very effective power for steering the tractor. When the shaft 26 is rotated in one direction, the plunger 20 will be forced forward, thereby imparting an adjustment to the guide wheel 10 which will cause the tractor to turn toward the right, and conversely, when the said shaft 26 is rotated in an opposite direction, the plunger 20 will be drawn rearward and the guide wheel 10 will be given an adjustment which will cause the tractor to turn toward the left. When running in a furrow, the guide wheel should be so set that it will hug the land side edge of the furrow and thereby automatically follow the furrow and guide the tractor without requiring the attention of the operator. When running on smooth or unplowed ground or where there is no furrow for the guide wheel to follow, the steering of the tractor is controlled by manipulation of the hand wheel 28 and through the connections described, the said guide wheel 10, the action of this, of course, not being automatic.

What I claim is:

1. The combination with a running gear having front wheels mounted for angular steering movements, of a steering frame arranged to partake of the horizontal angular movements of said front wheels, a journal bracket swiveled to the front end of said frame, a guide wheel journaled to said journal bracket, and connections extending rearward from said journal bracket and adapted to be manipulated to impart angular steering movements to said guide wheel, the said connections including a thrust rod, a rotary steering shaft, and coöperating screw-threaded elements, one connected to said steering shaft for rotation therewith and the other connected to said thrust rod for endwise movement therewith.

2. The combination with a running gear having front wheels mounted for angular steering movements, of a steering frame arranged to partake of the horizontal angular movements of said front wheels, a journal bracket swiveled to the front end of said frame, a guide wheel journaled to said journal bracket, and connections extending rearward from said journal bracket and adapted to be manipulated to impart angular steering movements to said guide wheel, the said connections including a short arm on the upper end of said journal bracket, a thrust rod extending rearward from said arm, a rotary steering shaft, and coöperating screw-threaded elements, one connected to said steering shaft for rotation therewith, and the other connected to said thrust rod for endwise movement therewith.

In testimony whereof I affix my signature in presence of two witnesses.

AUGUST STENQUIST.

Witnesses:
H. A. THOM,
H. E. HANSON.